(12) United States Patent
Burlatsky et al.

(10) Patent No.: US 7,507,494 B2
(45) Date of Patent: Mar. 24, 2009

(54) EXTENDED CATALYZED LAYER FOR MINIMIZING CROSS-OVER OXYGEN AND CONSUMING PEROXIDE

(75) Inventors: Sergei F. Burlatsky, Vernon, CT (US); Jared B. Hertzberg, Hyattsville, MD (US); Ned E. Cipollini, Enfield, CT (US); Thomas D. Jarvi, Manchester, CT (US)

(73) Assignee: UTC Power Corporation, South Windsor, CT (US)

( * ) Notice: Subject to any disclaimer, the term of this patent is extended or adjusted under 35 U.S.C. 154(b) by 532 days.

(21) Appl. No.: 10/795,181

(22) Filed: Mar. 4, 2004

(65) Prior Publication Data

US 2005/0196661 A1    Sep. 8, 2005

(51) Int. Cl.
*H01M 4/86* (2006.01)
*H01M 4/90* (2006.01)

(52) U.S. Cl. ........................................ 429/40
(58) Field of Classification Search ................ 429/40
See application file for complete search history.

(56) References Cited

U.S. PATENT DOCUMENTS

| | | |
|---|---|---|
| 4,438,216 A | 3/1984 | Kampe et al. |
| 5,342,494 A | 8/1994 | Shane et al. |
| 5,472,799 A | 12/1995 | Watanabe |
| 5,480,518 A | 1/1996 | Shane et al. |
| 5,523,181 A | 6/1996 | Stonehart et al. |
| 5,672,439 A | 9/1997 | Wilkinson et al. |
| 5,766,787 A | 6/1998 | Watanabe et al. |
| 5,795,669 A | 8/1998 | Wilkinson et al. |
| 5,800,938 A | 9/1998 | Watanabe |
| 5,874,182 A | 2/1999 | Wilkinson et al. |
| 5,981,097 A * | 11/1999 | Rajendran .................. 429/33 |
| 6,242,135 B1 | 6/2001 | Mushiake |
| 6,309,769 B1 | 10/2001 | Haug |
| 6,335,112 B1 | 1/2002 | Asukabe et al. |
| 2003/0008196 A1 | 1/2003 | Wessel et al. |
| 2003/0059664 A1 | 3/2003 | Menjak et al. |

FOREIGN PATENT DOCUMENTS

| | | |
|---|---|---|
| AU | 1013703 | 12/1965 |
| EP | 0309337 | 3/1980 |
| EP | 1298751 A2 * | 4/2003 |
| JP | 2001-118591 | 4/2001 |

* cited by examiner

*Primary Examiner*—Tracy Dove
(74) *Attorney, Agent, or Firm*—Bachman & LaPointe, P.C.

(57) ABSTRACT

A membrane electrode assembly includes an anode, a cathode, a membrane disposed between the anode and the cathode, and an extended catalyzed layer between the cathode and the membrane, the extended catalyzed layer being adapted to consume oxygen and decompose hydrogen peroxide to produce water.

21 Claims, 3 Drawing Sheets

EXTENDED CATALYZED LAYER FOR MINIMIZING CROSS-OVER OXYGEN AND CONSUMING PEROXIDE

BACKGROUND OF THE INVENTION

The invention relates to fuel cells and, more particularly, to PEM fuel cells and reduction in degradation of the membrane of same.

In a PEM fuel cell, a small amount of oxygen diffuses from the cathode to the anode through the membrane and can form peroxide by reacting with hydrogen at low potential at the anode catalyst surface. This peroxide can dissociate into highly reactive free radicals. These free radicals can rapidly degrade the membrane.

While numerous sources of oxygen, hydrogen and/or peroxide can contribute to this problem, it is oxygen crossing over from the cathode and hydrogen peroxide generated at the cathode which is the focus of the present invention.

It is a primary object of the present invention to minimize degradation caused by such sources of reactive free radicals.

It is a further object of the present invention to provide a membrane electrode assembly having an extended lifetime due to such reduction of oxygen crossover and resulting degradation.

Other objects and advantages of the present invention will appear hereinbelow.

SUMMARY OF THE INVENTION

In accordance with the present invention, the foregoing objects and advantages have been readily attained.

According to the invention, a membrane electrode assembly has been provided which comprises an anode, a cathode, a membrane disposed between the anode and the cathode; and an extended catalyzed layer between the cathode and the membrane, the extended catalyzed layer being adapted to consume oxygen to produce water.

In further accordance with the invention, the extended catalyzed layer, comprised of mostly interconnected catalyst particles electronically connected to the cathode, can advantageously be embedded within a portion of the membrane to a desired depth whereby these particles serve to consume oxygen before peroxide can be formed from it at the anode and consume hydrogen peroxide generated at the cathode thereby avoiding the potential degradation as discussed above.

In a further embodiment of the present invention, the extended catalyzed layer is provided as a catalyst layer positioned at a suitable distance or position within the membrane where peroxide formation is most likely, and this catalyst serves to prevent such formation, and to decompose any peroxide that diffuses into the layer, particularly when maintained at a desired oxygen consuming potential.

BRIEF DESCRIPTION OF THE DRAWINGS

A detailed description of preferred embodiments of the present invention follows, with reference to the attached drawings, wherein.

DETAILED DESCRIPTION

The invention relates to fuel cells, especially to PEM fuel cells, and more specifically to reduction of oxygen crossover from the cathode through positioning of an extended or catalyzed layer which consumes this oxygen and thereby avoids its two electron reduction to hydrogen peroxide.

Figure 1:
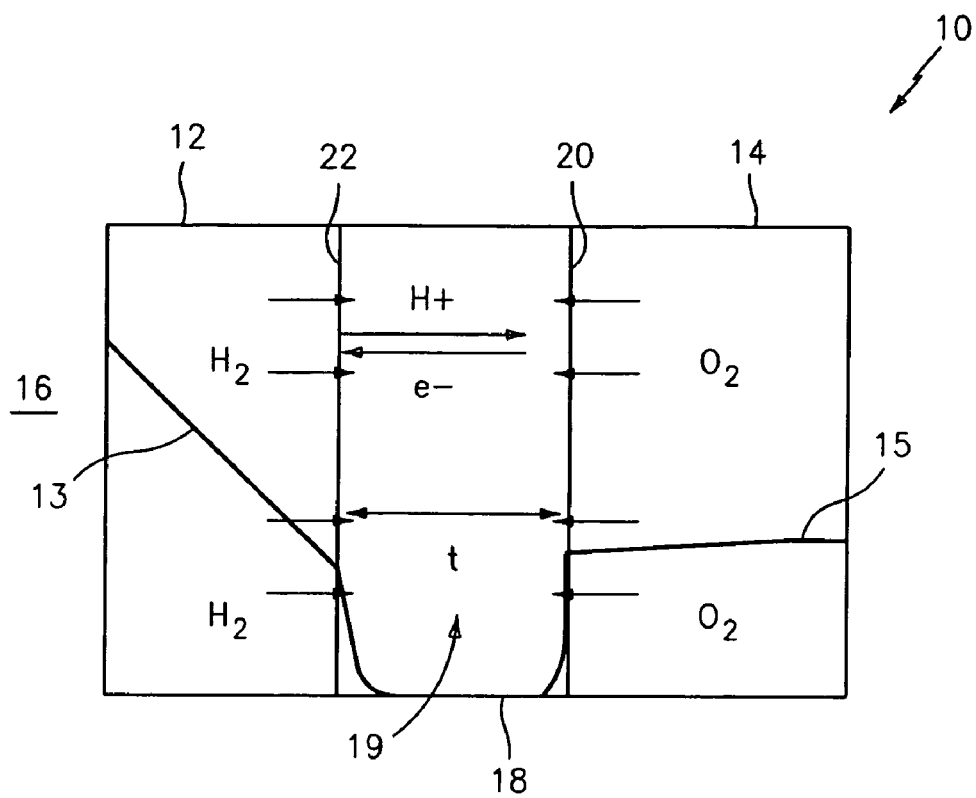
FIG. 1 schematically illustrates a portion of a membrane electrode assembly including an extended catalyzed layer in accordance with the present invention.

Turning to FIG. 1, a membrane electrode assembly 10 is illustrated in accordance with the present invention and includes a membrane 12, a cathode 14 and anode 16. Membrane 12 is positioned between cathode 14 and anode 16 and serves to provide function of a fuel cell electrolyte as is well known to persons of ordinary skill in the art. In the course of such operation, hydrogen diffuses through anode 16 into and through membrane 12, and oxygen diffuses through cathode 14 and into and through membrane 12 and these components can form peroxide, predominantly at the anode. The hydrogen and oxygen flux are substantially the same as crossover current, which is typically approximately 2-4 mA/cm$^2$. In accordance with the invention, extended catalyzed layer 18 is provided between membrane 12 and cathode 14, and extended catalyzed layer 18 advantageously serves to consume oxygen as it diffuses from cathode 14 into layer 18, thereby avoiding the possibility of formation of peroxide at the anode. FIG. 1 shows oxygen concentration 15 from cathode 14 to layer 18, and also shows hydrogen concentration 13 in membrane 12 and layer 18. As shown, a central portion 19 of layer 18 is defined where peroxide is decomposed and/or not generated in accordance with the invention.

Extended catalyzed layer 18 can be provided in several forms in accordance with various embodiments of the present invention. In accordance with a preferred embodiment of the present invention the extended catalyst layer 18 comprises a portion of catalyst, for example carbon supported platinum particles, the gas pores of which are filled with polymer electrolyte. Other suitable catalyst includes carbon itself, as well as platinum alloys, preferably platinum cobalt and platinum nickel, which may be supported on carbon.

At the relatively high potential which will be present in extended catalyzed layer 18, the four electron reduction of oxygen is predominately achieved so as to produce water and not produce peroxide.

The extended catalyzed layer serves to consume such oxygen at high potential, most actively at the interface 20 between extended catalyzed layer 18 and cathode 14. Extended catalyzed layer 18 further serves to consume hydrogen at the interface 22 between membrane 12 and extended catalyst layer 18. Further, extended catalyzed layer 18 also provides for benign decomposition of peroxide at interface 20 and throughout the thickness of the layer 18 if peroxide is generated in cathode 14 and at interface 22 and throughout the thickness of layer 18 if peroxide is generated in anode 16. These functions advantageously serve to reduce a significant contributor toward cell degradation, and are therefore advantageous and well suited for use in the environment of the present invention.

In order to provide desirable results, extended catalyzed layer 18 is advantageously electrically connected to cathode 14 through an electrically conducting phase, for example such as carbon support material, so as to ensure high potential and, therefore, consumption of crossover oxygen to produce water.

Extended catalyzed layer 18 further preferably has substantially no porosity and a relatively high oxygen reduction rate. This will result in a maximized ratio of oxygen reduction rate to oxygen diffusion rate, and thereby will minimize oxygen escape from the extended cathode and crossover rate to the anode.

In this regard, extended catalyzed layer 18 advantageously has a porosity of less than about 30%, and is preferably substantially non-porous. Oxygen reduction rate per unit platinum surface area for extended catalyzed layer 18 is also advantageously approximately the same as the cathode because of electrical connectivity to the cathode.

Any porosity of extended catalyzed layer 18 should advantageously be flooded during operation, for example with water, so as to reduce the oxygen diffusion rate through the extended catalyzed layer 18.

Provision of an extended catalyzed layer 18 having these properties advantageously results in efficient oxygen consumption at interface 20 and throughout layer 18 and, therefore, extended membrane life as compared to other types of membrane electrode assemblies.

Figure 2:
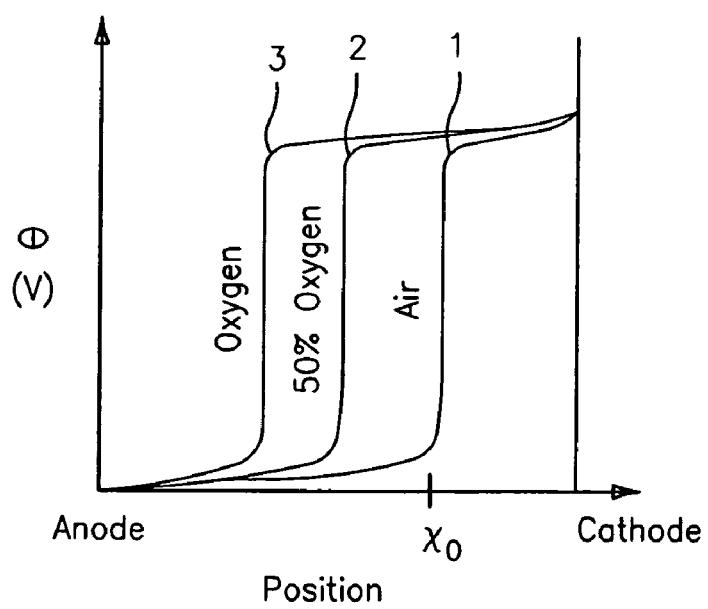
FIG. 2 illustrates calculated potential in a membrane containing isolated Pt. particles versus position between the anode and the cathode for oxygen, air and 50% oxygen atmospheres.

In further accordance with the invention it has been found that there is a position $X_0$ between anode 16 and cathode 14 of a membrane electrode assembly where a reaction potential shifts from a low value to a high value. If electrically isolated catalyst particles are present, this is a very likely position for formation of peroxide and subsequent generation of radicals assuming no steps are taken to avoid crossover of oxygen and hydrogen. FIG. 2 shows a calculated plot of the potential of these catalyst particles within the membrane with no extended catalyst layer for three possible cathode oxygen concentrations. In each case, $X_0$ is the point 3, 2, 1 where the potential jumps sharply as hydrogen and oxygen react on the catalyst particles in the membrane.

Thus, position $X_0$ is an excellent position for embedding interconnected catalyst particles or layers electrically connected to the cathode such as the extended catalyzed layer of the present invention, in order to minimize the possibility for formation of peroxide.

Figure 3:
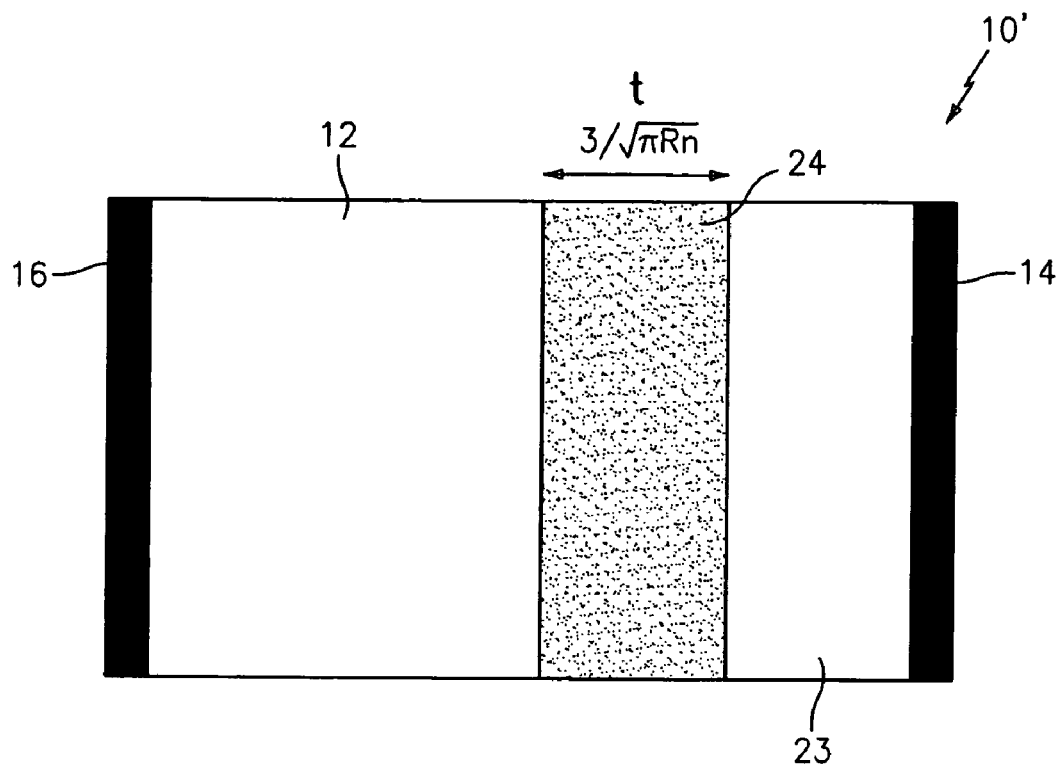
FIG. 3 schematically illustrates a membrane electrode assembly in accordance with an alternative embodiment of the present invention wherein the extended catalyst layer is provided as a catalyzed layer in the membrane electrically connected to the cathode.

Determination of where position $X_0$ would be in the absence of layer 18 in FIG. 1 or layer 24 in FIG. 3 can advantageously be done according to the following:

$$X_o = \frac{H_{H_2} \cdot D_{H_2} \cdot C^o_{H_2}}{H_{H_2} \cdot D_{H_2} \cdot C^o_{H_2} + 2 \cdot H_{O_2} \cdot D_{O_2} \cdot C^o_{O_2}}$$

Wherein: $H_{H_2}$ is the Henry constant of hydrogen from gas into ionic polymer of the membrane;
$D_{H_2}$ is the diffusion constant of hydrogen in the ionic polymer;
$C^o_{H_2}$ is concentration of hydrogen at the anode;
$H_{O_2}$ is the Henry constant of oxygen from gas into ionic polymer of the membrane; and
$D_{O_2}$ is the diffusion constant of oxygen in ionic polymer
$C^o_{O_2}$ is concentration of oxygen at the cathode.

$X_O$ is the fraction of membrane thickness from anode to cathode.

In the embodiment of the present invention wherein extended catalyzed layer 18 extends from cathode 14 towards membrane 12, extended catalyzed layer 18 is advantageously positioned so as to extend beyond position $X_0$. Preferably, extended catalyzed layer 18 has a thickness t which can be determined as follows:

$$t \geq 3/\sqrt{\pi R n},$$

wherein
t is layer thickness,
R is catalyst particle radius, and
n is catalyst particle concentration.

Provision of extended catalyzed layer 18 extending beyond position $X_0$ and having a thickness t as determined above advantageously provides sufficient cathode layer to reduce oxygen as desired and, also, to perform such function at point $X_0$ where it is most critical.

Turning to FIG. 3, a further embodiment of the present invention is illustrated wherein a catalyst layer 24 is physically positioned between cathode 14 and membrane 12. In accordance with this embodiment of the present invention, and as illustrated in FIG. 3, a membrane electrode assembly 10' can be provided including a membrane 12, a cathode 14 and an anode 16, with membrane 12 positioned between cathode 14 and anode 16 as illustrated. Position $X_0$ is shown in FIG. 3, and extended catalyzed layer 24 advantageously extends in either direction around position $X_0$. Catalyst layer 24 can further advantageously have a thickness and composition selected to provide most effective oxygen consumption and peroxide decomposition at minimum cost. To form this layer, particles of catalyst such as platinum can be embedded into the PEM membrane material at position $X_0$, at a density sufficiently high to protect the membrane, but sufficiently low as not to inhibit ionic transport. Preferably, the layer has a thickness (t) which is determined as follows:

$$t \geq 3/\sqrt{\pi R n},$$

wherein
t is layer thickness,
R is catalyst particle radius, and
n is catalyst particle concentration.

Cost of assembly 10' can be minimized by providing catalyzed layer 24 as thin as possible. It should also be noted that catalyzed layer 24 will advantageously decompose any peroxide which reaches it from anode 16 or from cathode 14. In a cell running on reformate fuel, position $X_0$ will be closer to anode 16 than in a cell running on pure hydrogen. When MEA 10' is fabricated, however, position $X_0$ of catalyzed layer 24 can be tailored to a cell's expected operating condition. In determining position $X_0$, it should be appreciated that diffusion and Henry constants which appear in the formula and determination of $X_0$ will vary with temperature and humidity. Thus, the thickness of protective catalyzed layer 24 can be extended to account for consequent uncertainties in $X_0$.

In further accordance with this embodiment of the present invention, it has been found that catalyst layer 24 consumes oxygen most effectively when at a potential which is between a high value which is about 100 mV less than open circuit voltage, and a low value which is about 0.3 V above the hydrogen potential, preferably about 0.4 V above the hydrogen potential, to minimize peroxide formation. Such oxygen consumption potential ensures that the catalyst particles operate in a diffusion limited rather than a kinetically-limited regime. In order to provide such catalyst layer, layer 24 can advantageously be electrically connected to cathode 14 preferably through a resistance which imposes a potential drop of at least about 100 mV as compared to cathode 14. Hydrogen crossover can drive current through such a resistance and for a 30 micron membrane, hydrogen crossover is approximately 1 mA/cm$^2$. Under such circumstances, to achieve a potential drop of 100 mV, the area-specific resistance should be 100 ohm-cm$^2$. As a specific example, in a 400 cm$^2$ cross-section MEA the resistance should be 0.25 ohm.

The resistance can be provided as an interconnecting layer 23 between catalyst layer 24 and cathode 14 and can be provided as a resistive element between the cathode and catalyst layer, or can be provided as membrane material separating cathode 14 and catalyzed layer 24 wherein the material is ionically-conducting and poorly-electrically conducting. For example, if the thickness between cathode 14 and catalyst layer 24 is 10 microns, the bulk electrical resistivity of the material should be 10$^5$ ohm-cm. A material with these characteristics can be achieved by embedding conductive particles into the ionic polymer. The particles can be inert, for example carbon or gold, or can be catalytically active, for example platinum. All layers in this embodiment should be substantially non-porous and non-permeable to gas transport.

Figure 4:
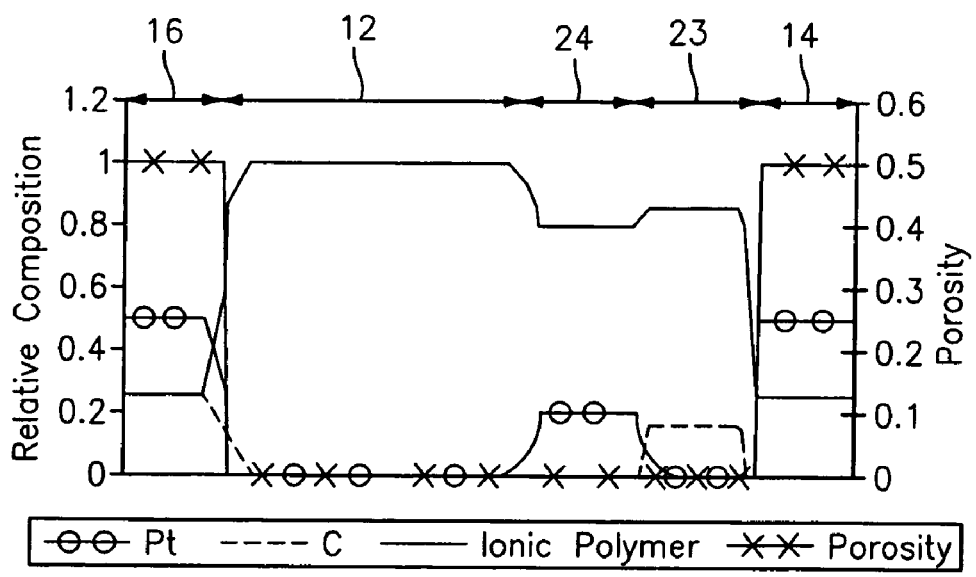
FIG. 4 illustrates relative composition and porosity for a membrane electrode assembly such as that illustrated in FIG. 3.

For an assembly in accordance with this embodiment, FIG. 4 shows an interrelation using platinum catalyst particles, ionic polymer for membrane material and carbon particles for electrically connecting same along with the porosity for each of these compositions. These properties of the cell are shown for location in the assembly including their values in the anode, membrane, extended catalyzed layer, interconnect layer and cathode.

As shown, in accordance with this embodiment of the present invention, porosity can be relatively high at the anode and cathode, and is preferably substantially 0 in the membrane, at catalyst layer 24 and within interconnecting layer 23.

Also as shown in FIG. 4, while platinum may be present in the anode and cathode, it is also present to a smaller extent in layer 24.

The same is true in connection with carbon, which is positioned in greater amounts in anode and cathode and also in the interconnecting portion 23 of the membrane between the cathode and the catalyst layer.

Figure 5:
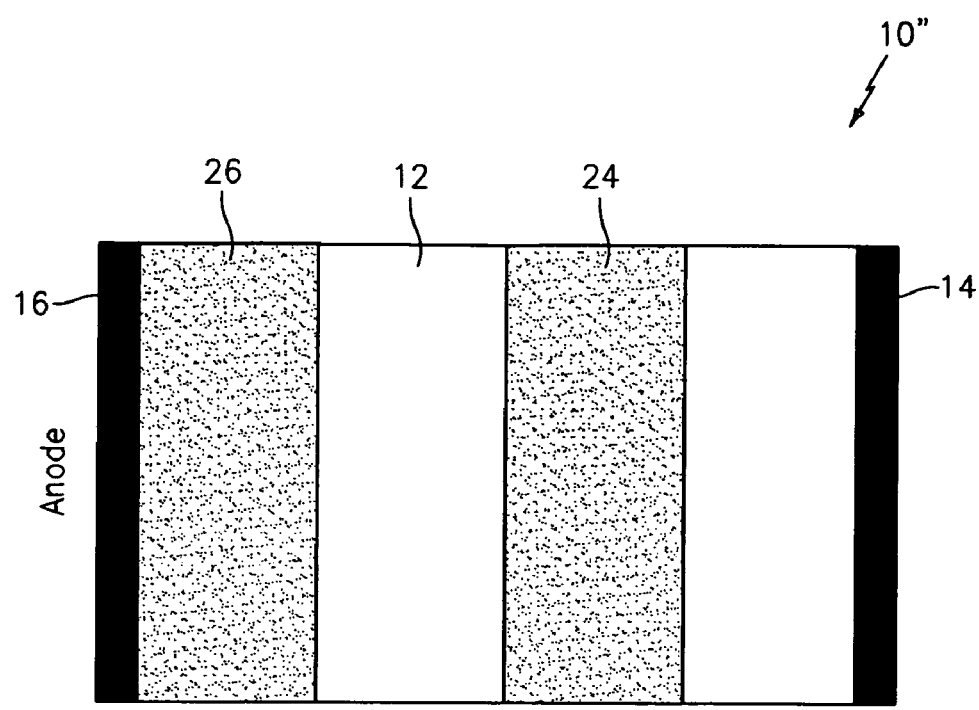
FIG. 5 illustrates a further embodiment of the present invention.

FIG. 5 illustrates a further embodiment of the invention which is well suited to a cell that may be operated using reformate fuel, for example, in this embodiment, assembly 10" includes membrane 12, cathode 14 and anode 16, as well as catalyst layer 24 as discussed above and a further catalyst layer 26 positioned beneath anode 16 or between anode 16 and membrane 12. Catalyst layer 26 in this embodiment advantageously serves to decompose peroxide generated at the anode, thereby further enhancing the protection of membrane 12 from degradation caused by such materials.

It should be noted that the subject matter of the present invention can advantageously be utilized in connection with various membranes including but not limited to reinforced membranes. The reinforced membranes can include membranes having mechanical reinforcements, examples of which include but are not limited those disclosed in U.S. Pat. Nos. 5,795,668, 6,485,856 and 6,613,203.

Catalyst layer 26, as well as layers 18,24, can advantageously be provided as a porous, electrically connected and ionically conductive structure having a porosity of between about 0% and about 30%. The catalyst can be present in an amount between about 5 and about 50% vol based upon volume of the layer. Ionomer is also present in an amount between about 5 and about 50% vol. based upon volume of the layer. Layer also advantageously has a thickness t as set forth above in connection with layers 18, 24, and can be provided having particles selected from the group consisting of particles of carbon, particles of platinum and platinum alloy, and combinations thereof.

Fluoride-emission rates from a fuel cell are indicative of membrane degeneration, including degradation due to exposure to peroxide. Measurements of reduced fluoride emission can demonstrate protection of the membrane from degeneration.

In order to demonstrate effectiveness of the present invention, F-emission rates were measured from fuel cells using a cathode that incorporates the preferred embodiment of the invention as illustrated in FIG. 1. Cell conditions were chosen which would normally accelerate chemical attack on the membrane. These fluoride emission rates are indicative of chemical attack rates of the polymer, and are measured by fluoride analysis of condensed reactant gases at the effluent of the fuel cell. A base line test was also conducted utilizing a fuel cell which does not have the configuration of FIG. 1, at the same conditions, and fluoride emission rates were also predicted by a phenomenological model.

Figure 6:
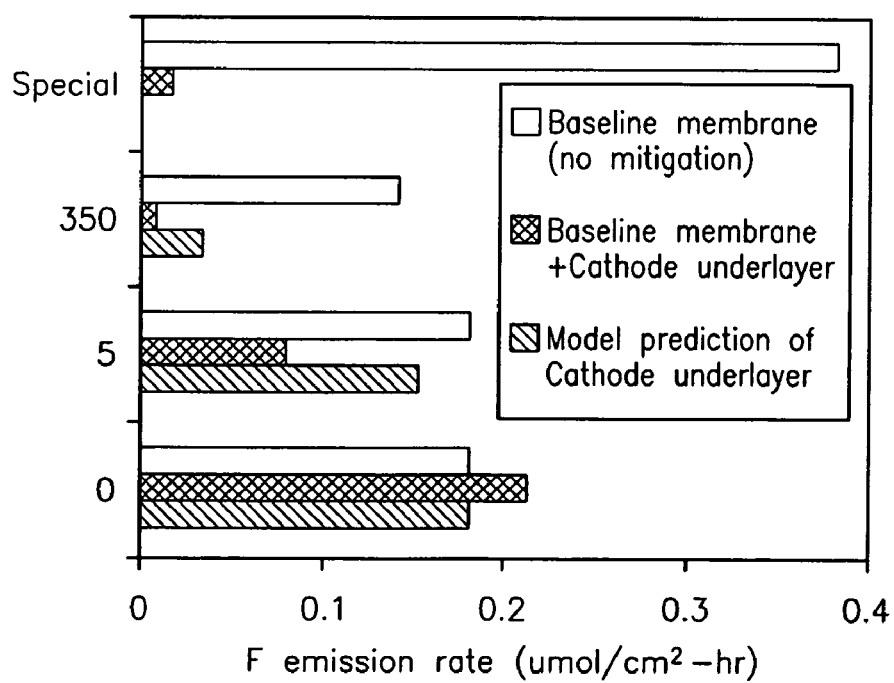
FIG. 6 illustrates measured and predicted fluoride emission rates for a baseline fuel cell and a fuel cell in accordance with a preferred embodiment of the present invention.

FIG. 6 shows data obtained using these different methods, at various current densities to illustrate the effect of preferred embodiment 1 during cell operation. A "special" condition was also tested and is shown in FIG. 6. This condition corresponds to an accelerated cell condition that best represents a transient environment in an operating fuel cell.

FIG. 6 illustrates that the configuration of the preferred embodiment, that is, FIG. 1, is capable of providing greater than a 10× mitigation in chemical attack rate of the membrane at 350 mA/cm$^2$, and this is also demonstrated in the "special" condition.

Further, the trends of the model prediction are indicative that the phenomenological model is predicting the essential physics of the problem. Thus, the assembly of the present invention utilizing an extended catalyst layer advantageously drastically reduces fluoride emission from fuel cells and, therefore, is effective in reduction of attack of the membrane due to peroxide.

It should be noted that there has been provided in accordance with the present invention a solution to the problem of oxygen crossover from the cathode, in the form of an extended catalyzed layer which can advantageously be positioned to reduce oxygen crossing over through the cathode and form water. This is particularly advantageous in that such crossover oxygen is consumed and removed without forming the peroxide which is known to lead to degradation of the membrane.

It is apparent that there has been provided in accordance with the present invention a membrane electrode assembly wherein oxygen crossover from the cathode is minimized. This fully satisfies the objects, means, and advantages set forth previously herein. While the present invention has been described in the context of specific embodiments thereof, other alternatives, modifications, and variations will become apparent to those skilled in the art having read the foregoing description. Accordingly, it is intended to embrace those alternatives, modifications, and variations as fall within the broad scope of the appended claims.

What is claimed:

1. A membrane electrode assembly, comprising:
   an anode;
   a cathode;
   a membrane disposed between the anode and the cathode; and an extended catalyzed layer between the cathode and the membrane, the extended catalyzed layer being adapted to reduce oxygen, and decompose hydrogen peroxide and free radicals to produce water, wherein the layer is less porous than the anode and the cathode, and wherein the extended catalyzed layer contains catalyst particles and has a thickness (t) determined as follows:

$$t \geq \frac{3}{\sqrt{\pi R n}},$$

wherein,
   t is layer thickness,
   R is catalyst particle radius, and
   n is catalyst particle concentration, and wherein the extended catalyzed layer has a porosity of less than 30%.

2. The assembly of claim 1, wherein the particles are selected from the group consisting of particles of carbon, particles of platinum, particles of platinum alloy and combinations thereof.

3. The assembly of claim 2, wherein the particles are supported on carbon.

4. The assembly of claim 2, wherein the particles are platinum alloy selected from the group consisting of platinum cobalt, platinum nickel and combinations thereof.

5. The assembly of claim 1, wherein the extended catalyzed layer is electrically connected to the cathode.

6. The assembly of claim 5, wherein the extended catalyzed layer is electrically connected to the cathode through a support material.

7. The assembly of claim 6, wherein the support material is carbon.

8. The assembly of claim 1, wherein the extended catalyzed layer is substantially non-porous.

9. The assembly of claim 1, wherein the extended catalyzed layer has porosity which is flooded with water.

10. The assembly of claim 1, wherein the extended catalyzed layer has an oxygen reduction rate which is substantially the same or greater than the cathode.

11. The assembly of claim 1, wherein the extended catalyzed layer extends from the edge of the cathode facing the membrane into the membrane the distance t.

12. The assembly of claim 1, wherein the extended catalyzed layer comprises particles of a catalyst which is the same catalyst as is present in the cathode.

13. A membrane electrode assembly, comprising:
    an anode;
    a cathode;
    a membrane disposed between the anode and the cathode; and an extended catalyzed layer between the cathode and the membrane, the extended catalyzed layer being adapted to reduce oxygen, and decompose hydrogen peroxide and free radicals to produce water, wherein the extended catalyzed layer comprises a catalyst layer disposed in the membrane and having an oxygen consuming potential between a low value of about 0.3V above the hydrogen potential and a high value of about 100 mV less than open circuit voltage, and wherein the layer is centered around a position $X_0$ determined according to the following:

$$X_o = \frac{H_{H_2} \cdot D_{H_2} \cdot C^o_{H_2}}{H_{H_2} \cdot D_{H_2} \cdot C^o_{H_2} + 2 \cdot H_{O_2} \cdot D_{O_2} \cdot C^o_{O_2}}$$

wherein:
  $H_{H_2}$ is the Henry constant of hydrogen from gas into ionic polymer of the membrane;
  $D_{H_2}$ is the diffusion constant of hydrogen in the ionic polymer;
  $C^o_{H_2}$ is concentration of hydrogen at the anode;
  $H_{O_2}$ is the Henry constant of oxygen from gas into ionic polymer of the membrane;
  $D_{O_2}$ is the diffusion constant of oxygen in the ionic polymer, and
  $C^o_{O_2}$ is concentration of oxygen at the cathode, further comprising an additional extended catalyzed layer positioned between the anode and the membrane and adapted to reduce oxygen and decompose hydrogen peroxide to produce water, and wherein the extended catalyzed layer has a porosity of less than 30%.

14. The assembly of claim 13, wherein the layer contains catalyst particles and has a thickness (t) determined as follows:

$$t \geq 3/\sqrt{\pi R n},$$

wherein
  t is layer thickness,
  R is catalyst particle radius, and
  n is catalyst particle concentration.

15. The assembly of claim 13, wherein the catalyst layer is electrically connected to the cathode through a resistance selected to provide the catalyst layer with the oxygen consuming potential.

16. The assembly of claim 13, wherein the additional extended catalyzed layer contains catalyst particles and has a thickness (t) determined as follows:

$$t \geq 3/\sqrt{\pi R n},$$

wherein,
  t is layer thickness,
  R is catalyst particle radius, and
  n is catalyst particle concentration.

17. The assembly of claim 13, wherein the additional extended catalyzed layer contains catalyst particles, and wherein the particles are selected from the group of particles of carbon, particles of platinum, particles of platinum alloy and combinations thereof.

18. The assembly of claim 17, wherein the particles are supported on carbon.

19. The assembly of claim 13, wherein the extended catalyzed layer is substantially non-porous.

20. A membrane electrode assembly, comprising:
    an anode;
    a cathode;
    a membrane disposed between the anode and the cathode; and an extended catalyzed layer between the cathode and the membrane, the extended catalyzed layer being adapted to reduce oxygen, and decompose hydrogen peroxide and free radicals to produce water, wherein the layer is less porous than the anode and the cathode, and wherein the extended catalyzed layer contains catalyst particles and has a thickness (t) determined as follows:

$$t \geq 3 / \sqrt{\pi R n},$$

wherein,
t is layer thickness,
R is catalyst particle radius, and
n is catalyst particle concentration, wherein the extended catalyzed layer is a porous electrically connected and ionically conductive structure having a porosity of between about 0% and about 30%, wherein the catalyst is present in an amount between about 5 and about 50% vol based upon volume of the layer, and ionomer is present in an amount between about 5 and about 50% vol based upon volume of the layer.

21. The assembly of claim 1, wherein the membrane is a reinforced membrane.

* * * * *

UNITED STATES PATENT AND TRADEMARK OFFICE
CERTIFICATE OF CORRECTION

PATENT NO.       : 7,507,494 B2
APPLICATION NO.  : 10/795181
DATED            : March 24, 2009
INVENTOR(S)      : Sergei F. Burlatsky et al.

It is certified that error appears in the above-identified patent and that said Letters Patent is hereby corrected as shown below:

In column 7, claim 1, line 13, $$t \geq \frac{3}{\sqrt{\pi R n}},$$

should read $$t \geq 3/\sqrt{\pi R n},$$

Signed and Sealed this

Thirtieth Day of June, 2009

JOHN DOLL
*Acting Director of the United States Patent and Trademark Office*